United States Patent
Dougherty

(10) Patent No.: US 10,883,654 B2
(45) Date of Patent: Jan. 5, 2021

(54) SOAP WAND HOLDER ASSEMBLY

(71) Applicant: Arthur Dougherty, Albuquerque, NM (US)

(72) Inventor: Arthur Dougherty, Albuquerque, NM (US)

( * ) Notice: Subject to any disclaimer, the term of this patent is extended or adjusted under 35 U.S.C. 154(b) by 0 days.

(21) Appl. No.: 16/433,863

(22) Filed: Jun. 6, 2019

(65) Prior Publication Data

US 2020/0386366 A1    Dec. 10, 2020

(51) Int. Cl.
*F16M 13/02* (2006.01)
*A47L 17/00* (2006.01)

(52) U.S. Cl.
CPC ........... *F16M 13/022* (2013.01); *A47L 17/00* (2013.01)

(58) Field of Classification Search
CPC ...... F16M 13/022; F16M 13/02; A47L 17/00; B44D 3/123; B44D 3/12; A46B 17/02; A46B 81/02; F16B 2/248; A47G 29/08; A47K 1/09
See application file for complete search history.

(56) References Cited

U.S. PATENT DOCUMENTS

| | | | |
|---|---|---|---|
| 1,580,847 A | 4/1926 | Moineau | |
| 1,685,277 A * | 9/1928 | Dryden | A47G 25/005 211/35 |
| 1,936,517 A * | 11/1933 | Maine | F25D 23/126 62/466 |
| 2,325,595 A * | 7/1943 | Dleke | B44D 3/123 248/113 |
| 4,672,703 A * | 6/1987 | Frazier | A47C 21/003 211/119 |
| 5,711,502 A | 1/1998 | Emalfarb | |
| 6,065,727 A * | 5/2000 | Fitzgerald | A47C 20/041 248/302 |
| 6,330,948 B1 | 12/2001 | Leto | |
| 8,770,531 B2 * | 7/2014 | Cundy | B65F 1/1415 248/303 |
| D748,358 S | 1/2016 | Coller | |
| 2004/0124329 A1 | 7/2004 | Scribner | |
| 2012/0024807 A1 | 2/2012 | Fullman | |
| 2014/0034795 A1 * | 2/2014 | Brinkmann | F16M 13/02 248/213.2 |

* cited by examiner

*Primary Examiner* — Anita M King

(57) ABSTRACT

A soap wand holder assembly for holding a soap wand in a vertical orientation for storage includes a first bracket that is positionable over a bridge portion of a double kitchen sink. A second bracket is positionable over the bridge portion of the double kitchen sink. A spacer is coupled between each of the first and second brackets for spacing the first and second brackets apart from each other. A holder is coupled between each of the first bracket and the second bracket. A soap wand is positionable in the holder when the first and second brackets are positioned on the bridge portion of the double kitchen sink.

11 Claims, 4 Drawing Sheets

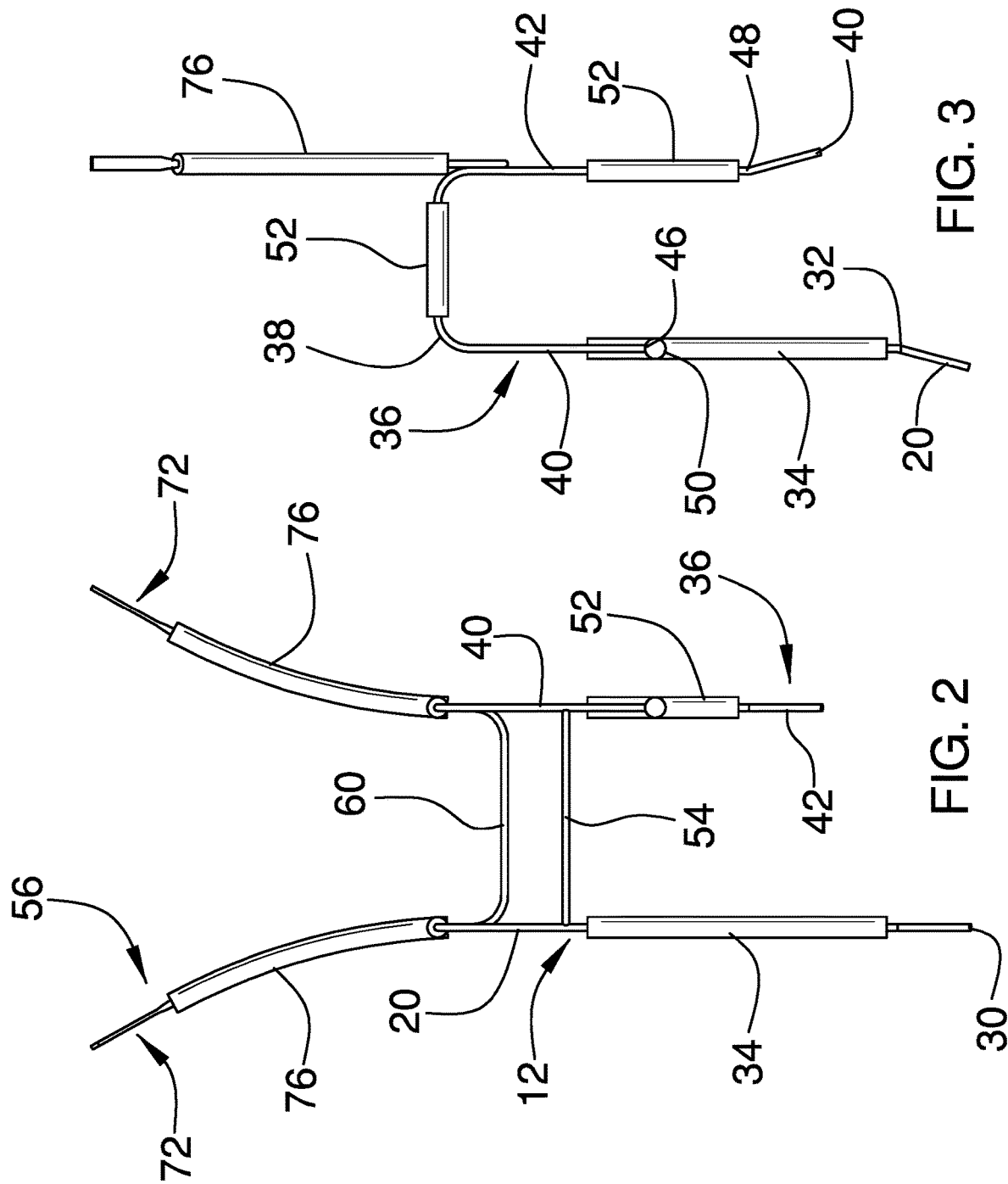

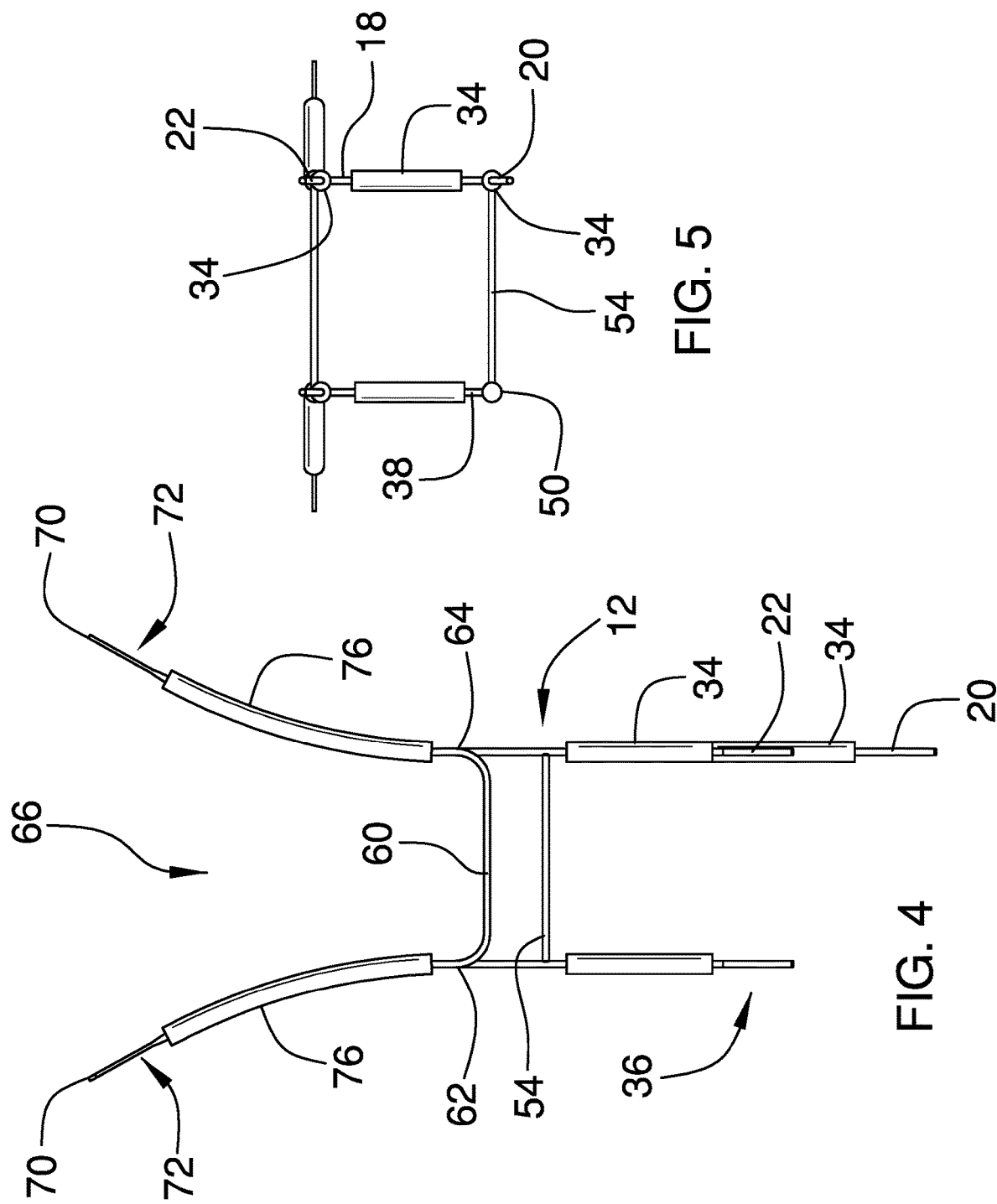

SOAP WAND HOLDER ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to holder devices and more particularly pertains to a new holder device for holding a soap wand in a vertical orientation for storage.

BRIEF SUMMARY OF THE INVENTION

An embodiment of the disclosure meets the needs presented above by generally comprising a first bracket that is positionable over a bridge portion of a double kitchen sink. A second bracket is positionable over the bridge portion of the double kitchen sink. A spacer is coupled between each of the first and second brackets for spacing the first and second brackets apart from each other. A holder is coupled between each of the first bracket and the second bracket. A soap wand is positionable in the holder when the first and second brackets are positioned on the bridge portion of the double kitchen sink.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a left side view of an embodiment of the disclosure.

FIG. 4 is a back view of an embodiment of the disclosure.

FIG. 5 is a bottom view of an embodiment of the disclosure.

DETAILED DESCRIPTION OF THE INVENTION

Figure 1:
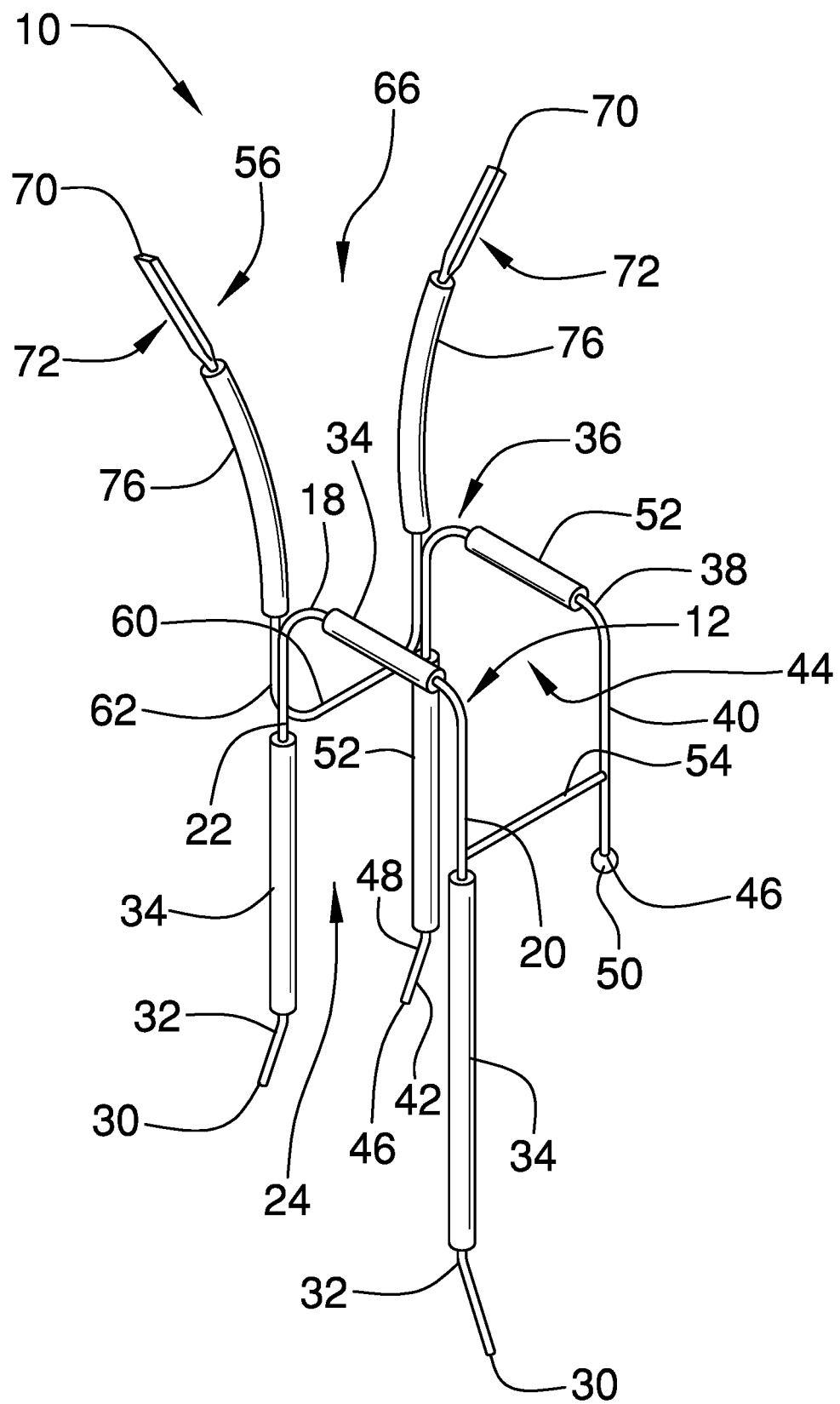
FIG. 1 is a perspective view of a soap wand holder assembly according to an embodiment of the disclosure.
Figure 6:
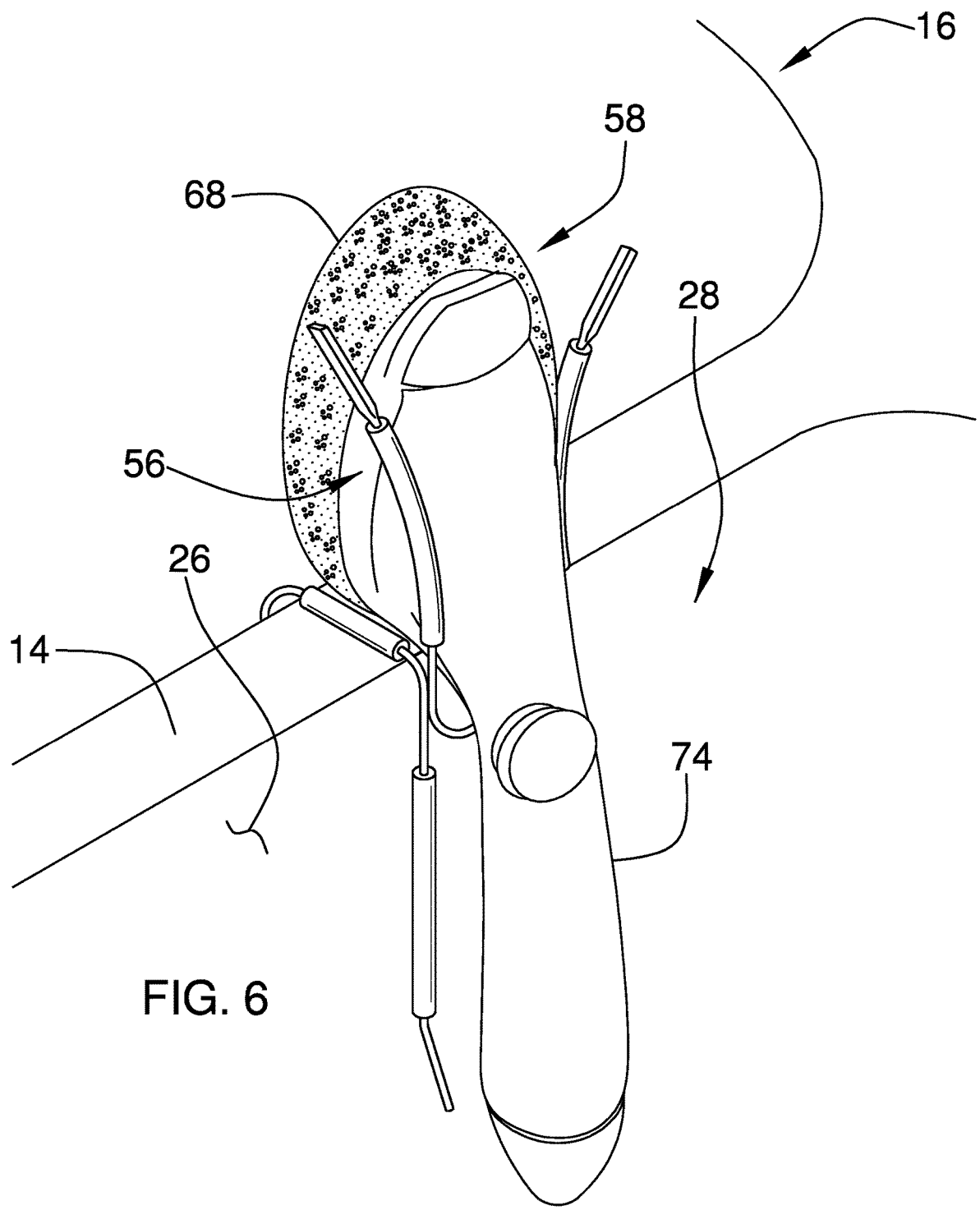
FIG. 6 is a perspective in-use view of an embodiment of the disclosure.

With reference now to the drawings, and in particular to FIGS. 1 through 6 thereof, a new holder device embodying the principles and concepts of an embodiment of the disclosure and generally designated by the reference numeral 10 will be described.

As best illustrated in FIGS. 1 through 6, the soap wand holder assembly 10 generally comprises a first bracket 12 that is positionable over a bridge portion 14 of a double kitchen sink 16. The double kitchen sink 16 may be a metal kitchen sink, a porcelain kitchen sink or any other conventional double kitchen sink 16. The first bracket 12 comprises a central member 18 extending a first downward member 20 and a second downward member 22 to define a bridge space 24 between each of the first 20 and second 22 downward members. The bridge portion 14 of the double kitchen sink 16 is positioned in the bridge space 24 having each of the first 20 and second 22 downward members extending downwardly along an interior surface 26 of a respective well 28 in the double kitchen sink 16.

Each of the first 20 and second 22 downward members has a distal end 30 with respect to the central member 18. The first downward member 20 has a length that is greater than a length of the second downward member 22. Each of the first 20 and second 22 downward members has a bend 32 thereon. The bend 32 on each of the first 20 and second 22 downward members is spaced from the distal end 30 of a respective one of the first 20 and second 22 downward members. Moreover, the distal end 30 of each of the first 20 and second 22 downward members is directed away from each other. In this way the distal end 30 of each of the first 20 and second 22 downward members resists engaging the bridge portion 14 of the double kitchen sink 16 when the first bracket 12 is positioned thereon.

A plurality of first pads 34 is each positioned around the first bracket 12. Each of the first pads 34 is comprised of a resiliently compressible material to frictionally engage the double kitchen sink 16 when the first bracket 12 is positioned on the bridge portion 14. Moreover, each of the first pads 34 is positioned around a respective one of the central member 18, the first downward member 20 and the second downward member 22. Each of the first pads 34 may have a tubular shape that surrounds the respective central 18, first downward 20 and second downward 22 members.

A second bracket 36 is included and the second bracket 36 is positionable over the bridge portion 14 of the double kitchen sink 16. The second bracket 36 comprises a middle member 38 extending between a primary downward member 40 and a secondary downward member 42 to define a bridge space 44 between each of the primary 40 and secondary 42 downward members. The bridge of the double kitchen sink 16 is positioned in the bridge space 44 between the primary 40 and secondary 42 downward members having each of the primary 40 and secondary 42 downward members extending downwardly along an interior surface 26 of a respective well 28 in the double kitchen sink 16.

Each of the primary 40 and secondary 42 downward members has a distal end 46 with respect to the middle member 38. The secondary downward member 42 has a length that is greater than a length of the primary downward member 40. Additionally, the primary downward member 40 has a length that is less than a length of each of the first 20 and second 22 downward members. The secondary downward member 42 has a bend 48 thereon and the bend 48 on the secondary downward member 42 is spaced from the distal end 46 of the secondary downward member 42. The distal end 46 of the secondary downward member 42 is directed away from the primary downward member 40 to resist engaging the bridge portion 14 of the double kitchen sink 16 when the second bracket 36 is positioned thereon.

A ball 50 is coupled to the distal end 46 of the primary downward member 40 and the ball 50 may be comprised of a resiliently compressible material. A plurality of second pads 52 is each positioned around the second bracket 36. Each of the second pads 52 is comprised of a resiliently compressible material to frictionally engage the double kitchen sink 16 when the second bracket 36 is positioned on the bridge portion 14. Additionally, each of the second pads 52 is positioned around a respective one of the middle member 38 and the primary downward member 40.

A spacer 54 is coupled between each of the first 12 and second 36 brackets for spacing the first 12 and second 36 brackets apart from each other. The spacer 54 extends between the first downward member 20 and the primary downward member 40. The spacer 54 is horizontally oriented when the first 12 and second 36 brackets are positioned on the bridge portion 14 of the double kitchen sink 16. Additionally, the spacer 54 is spaced from the central member 18 and the middle member 38.

A holder 56 is coupled between each of the first bracket 12 and the second bracket 36. The holder 56 holds a soap wand 58 when the first 12 and second 36 brackets are positioned on the bridge portion 14 of the double kitchen sink 16. The holder 56 comprises a medial member 60 extending between a first upright member 62 and a second upright member 64 to define a wand space 66 between the first 62 and second 64 upright members. The wand space 66 receives a head 68 of the soap wand 58. The soap wand 58 may be a liquid soap dispensing wand of any conventional design that includes a sponge, a brush or other type of scrubber.

Each of the first 62 and second 64 upright members has a distal end 70 with respect to the medial member 60. Additionally, each of the first 62 and second 64 upright members curves outwardly between the medial member 60 and the distal end 70 of the first 62 and second 64 upright members. Each of the first 62 and second 64 upright members has a flattened portion 72 extending from the distal end 70 of a respective one of the first 62 and second 64 upright members toward the medial member 60. The medial member 60 extends between the second downward member 22 of the first bracket 12 and the secondary downward member 42 of the second bracket 36. In this way the medial member 60 supports the head 68 of the soap wand 58 having a handle 74 of the soap wand 58 extending downwardly into the double kitchen sink 16 when the soap wand 58 is positioned in the holder 56. Each of the first 62 and second 64 upright members is vertically oriented when the first 12 and second 36 brackets are positioned on the bridge portion 14 of the double kitchen sink 16 to laterally restrain the soap wand 58 when the soap wand 58 is positioned in the holder 56.

A pair of third pads 76 is each positioned around the holder 56. Each of the third pads 76 is comprised of a resiliently compressible material to frictionally engage the head 68 of the soap wand 58 when the head 68 of the soap wand 58 is positioned in the wand space 66. Moreover, each of the third pads 76 is positioned around a respective one of the first 62 and second 64 upright members. Each of the third pads 76 extends from the flattened portion 72 of the respective first 62 and second 64 upright member toward the medial member 60.

In use, each of the first 12 and second 36 brackets is positioned on the bridge portion 14 of the double kitchen sink 16 when a soap wand 58 is finished being used. The head 68 of the soap wand 58 is positioned in the holder 56 such that the head 68 rests on the medial member 60 of the holder 56 and the handle 74 of the soap wand 58 extends downwardly into the double kitchen sink 16. In this way the soap wand 58 is vertically oriented to inhibit fluid soap in the soap wand 58 from leaking out of the head 68. Additionally, the head 68 of the soap wand 58 is exposed to air thereby facilitating the head 68 to dry. The first 12 and second 36 brackets can be removed from the bridge portion 14 of the double kitchen sink 16 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A soap wand holder assembly being configured to be placed on a bridge portion of a kitchen sink for holding a soap wand, said assembly comprising:
   a first bracket being positionable over the bridge portion of the double kitchen sink;
   a plurality of first pads, each of said first pads being positioned around said first bracket, each of said first pads being comprised of a resiliently compressible material wherein each of said first pads is configured to frictionally engage the double kitchen sink when said first bracket is positioned on the bridge portion;
   a second bracket being positionable over the bridge portion of the double kitchen sink;
   a plurality of second pads, each of said second pads being positioned around said second bracket, each of said second pads being comprised of a resiliently compressible material wherein each of said second pads is configured to frictionally engage the double kitchen sink when said second bracket is positioned on the bridge portion;
a spacer being coupled between each of said first and second brackets for spacing said first and second brackets apart from each other;
a holder being coupled between each of said first bracket and said second bracket wherein said holder is configured to hold the soap wand when said first and second brackets are positioned on the bridge portion of the double kitchen sink, said holder having a wand space;
a pair of third pads, each of said third pads being positioned around said holder, each of said third pads being comprised of a resiliently compressible material wherein each of said third pads is configured to frictionally engage a head of the soap wand when the head of the soap wand is positioned in said wand space; and
wherein said first bracket comprises a central member extending between a first downward member and a second downward member to define a first bridge space between each of said first and second downward members wherein said bridge space is configured to have the bridge portion of the double kitchen sink being positioned therein having each of said first and second downward members extending downwardly along an interior surface of a respective one of a pair of wells in the double kitchen sink, each of said first and second downward members having a distal end with respect to said central member, said first downward member having a length being greater than a length of said second downward member.

2. The assembly according to claim 1, wherein each of said first and second downward members has a bend thereon, said bend on each of said first and second downward members being spaced from said distal end of a respective one of said first and second downward members, said distal end of each of said first and second downward members being directed away from each other wherein said distal end of each of said first and second downward members is configured to resist engaging the bridge portion of the double kitchen sink when said first bracket is positioned thereon.

3. The assembly according to claim 1, wherein said second bracket comprises a middle member extending between a primary downward member and a secondary downward member to define a bridge space between each of said primary and secondary downward members wherein said bridge space in said second bracket is configured to have the bridge portion of the double kitchen sink being positioned therein having each of said primary and secondary downward members extending downwardly along the interior surface of a respective one of the pair of wells in the double kitchen sink, each of said primary and secondary downward members having a distal end with respect to said middle member.

4. The assembly according to claim 3, wherein said secondary downward member has a length being greater than a length of said primary downward member, said primary downward member having a length being less than a length of each of said first and second downward members.

5. The assembly according to claim 4, wherein said secondary downward member has a bend thereon, said bend on said secondary downward member being spaced from said distal end of said secondary downward member, said distal end of said secondary downward member being directed away from said primary downward member wherein said distal end of said secondary downward member is configured to resist engaging the bridge portion of the double kitchen sink when said second bracket is positioned thereon.

6. The assembly according to claim 5, further comprising a ball being coupled to said distal end of said primary downward member.

7. The assembly according to claim 3, wherein said spacer extends between said first downward member and said primary downward member, said spacer being horizontally oriented when said first and second brackets are positioned on the bridge portion of the double kitchen sink, said spacer being spaced from said central member and said middle member.

8. The assembly according to claim 3, wherein said holder comprises a medial member extending between a first upright member and a second upright member to define said wand space between said first and second upright members wherein said wand space is configured to receive a head of the soap wand, each of said first and second upright members having a distal end with respect to said medial member, each of said first and second upright members being curving outwardly between said medial member and said distal end of said first and second upright members.

9. The assembly according to claim 8, wherein each of said first and second upright members has a flattened portion extending from said distal end of a respective one of said first and second upright members toward said medial member.

10. The assembly according to claim 9, wherein said medial member extends between said second downward member of said first bracket and said secondary downward member of said second bracket wherein said medial member is configured to support the head of the soap wand having a handle of the soap wand extending downwardly into the double kitchen sink when the soap wand is positioned in said holder, each of said first and second upright members being vertically oriented when said first and second brackets are positioned on the bridge portion of the double kitchen sink wherein each of said first and second upright members are configured to laterally restrain the soap wand when the soap wand is positioned in said holder.

11. A soap wand holder assembly being configured to be placed on a bridge portion of a kitchen sink for holding a soap wand, said assembly comprising:
a first bracket being positionable over the bridge portion of the double kitchen sink, said first bracket comprising a central member extending between a first downward member and a second downward member to define a bridge space between each of said first and second downward members wherein said bridge space is configured to have the bridge of the double kitchen sink being positioned therein having each of said first and second downward members extending downwardly along an interior surface of a respective well in the double kitchen sink, each of said first and second downward members having a distal end with respect to said central member, said first downward member having a length being greater than a length of said second downward member, each of said first and second downward members having a bend thereon, said bend on each of said first and second downward members being spaced from said distal end of a respective one of said first and second downward members, said distal end of each of said first and second downward members being directed away from each other wherein said distal end of each of said first and second downward members is configured to resist engaging the bridge portion of the double kitchen sink when said first bracket is positioned thereon;

a plurality of first pads, each of said first pads being positioned around said first bracket, each of said first pads being comprised of a resiliently compressible material wherein each of said first pads is configured to frictionally engage the double kitchen sink when said first bracket is positioned on the bridge portion, each of said first pads being positioned around a respective one of said central member, said first downward member and said second downward member;

a second bracket being positionable over the bridge portion of the double kitchen sink, said second bracket comprising a middle member extending between a primary downward member and a secondary downward member to define a bridge space between each of said primary and secondary downward members wherein said bridge space in said second bracket is configured to have the bridge of the double kitchen sink being positioned therein having each of said primary and secondary downward members extending downwardly along an interior surface of a respective well in the double kitchen sink, each of said primary and secondary downward members having a distal end with respect to said middle member, said secondary downward member having a length being greater than a length of said primary downward member, said primary downward member having a length being less than a length of each of said first and second downward members, said secondary downward member having a bend thereon, said bend on said secondary downward member being spaced from said distal end of said secondary downward member, said distal end of said secondary downward member being directed away from said primary downward member wherein said distal end of said secondary downward member is configured to resist engaging the bridge portion of the double kitchen sink when said second bracket is positioned thereon;

a ball being coupled to said distal end of said primary downward member;

a plurality of second pads, each of said second pads being positioned around said second bracket, each of said second pads being comprised of a resiliently compressible material wherein each of said second pads is configured to frictionally engage the double kitchen sink when said second bracket is positioned on the bridge portion, each of said second pads being positioned around a respective one of said middle member and said primary downward member;

a spacer being coupled between each of said first and second brackets for spacing said first and second brackets apart from each other, said spacer extending between said first downward member and said primary downward member, said spacer being horizontally oriented when said first and second brackets are positioned on the bridge portion of the double kitchen sink, said spacer being spaced from said central member and said middle member;

a holder being coupled between each of said first bracket and said second bracket wherein said holder is configured to hold the soap wand when said first and second brackets are positioned on the bridge portion of the double kitchen sink, said holder comprising a medial member extending between a first upright member and a second upright member to define a wand space between said first and second upright members wherein said wand space is configured to receive a head of the soap wand, each of said first and second upright members having a distal end with respect to said medial member, each of said first and second upright members being curving outwardly between said medial member and said distal end of said first and second upright members, each of said first and second upright members having a flattened portion extending from said distal end of a respective one of said first and second upright members toward said medial member, said medial member extending between said second downward member of said first bracket and said secondary downward member of said second bracket wherein said medial member is configured to support the head of the soap wand having a handle of the soap wand extending downwardly into the double kitchen sink when the soap wand is positioned in said holder, each of said first and second upright members being vertically oriented when said first and second brackets are positioned on the bridge portion of the double kitchen sink wherein each of said first and second upright members are configured to laterally restrain the soap wand when the soap wand is positioned in said holder; and a pair of third pads, each of said third pads being positioned around said holder, each of said third pads being comprised of a resiliently compressible material wherein each of said third pads is configured to frictionally engage the head of the soap wand when the head of the soap wand is positioned in said wand space, each of said third pads being positioned around a respective one of said first and second upright members, each of said third pads extending from said flattened portion of said respective first and second upright member toward said medial member.

* * * * *